(12) United States Patent
Terashima et al.

(10) Patent No.: US 9,057,938 B2
(45) Date of Patent: Jun. 16, 2015

(54) PROJECTOR

(75) Inventors: Tetsuo Terashima, Azumino (JP); Shunsuke Hino, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 143 days.

(21) Appl. No.: 13/992,831

(22) PCT Filed: Dec. 19, 2011

(86) PCT No.: PCT/JP2011/007074
§ 371 (c)(1),
(2), (4) Date: Jun. 10, 2013

(87) PCT Pub. No.: WO2012/095925
PCT Pub. Date: Jul. 19, 2012

(65) Prior Publication Data
US 2013/0258295 A1    Oct. 3, 2013

(30) Foreign Application Priority Data

Jan. 11, 2011    (JP) ................................. 2011-003362

(51) Int. Cl.
*G03B 21/16* (2006.01)
*H04N 9/31* (2006.01)

(52) U.S. Cl.
CPC .............. *G03B 21/16* (2013.01); *H04N 9/3197* (2013.01); *H04N 9/3144* (2013.01)

(58) Field of Classification Search
CPC ........................... H04N 9/3144; H04N 9/3197
USPC ............... 353/52, 54, 57, 98, 99; 362/249.02, 362/294, 311.02, 318.01; 349/5, 7–9
See application file for complete search history.

(56) References Cited

U.S. PATENT DOCUMENTS

| 7,703,927 B2 * | 4/2010 | Utsunomiya ................... 353/54 |
| 2001/0008439 A1 * | 7/2001 | Konuma et al. ................. 353/52 |
| 2005/0157269 A1 * | 7/2005 | Seto et al. ........................ 353/61 |
| 2005/0242741 A1 | 11/2005 | Shiota et al. |
| 2007/0115438 A1 * | 5/2007 | Tsubura .......................... 353/57 |

(Continued)

FOREIGN PATENT DOCUMENTS

| CN | 1698360 A | 11/2005 |
| JP | A-8-234848 | 9/1996 |

(Continued)

OTHER PUBLICATIONS

Patent Family Annex to International Search Report issued in International Patent Application No. PCT/JP2011/007074 dated May 18, 2012.

*Primary Examiner* — Sultan Chowdhury
(74) *Attorney, Agent, or Firm* — Oliff PLC (57) ABSTRACT

A projector includes a light source lamp, a cooling device adapted to feed a cooling fluid to the light source lamp to thereby cool the light source lamp, a lighting control section adapted to supply the light source lamp with the lamp electric power having either one of a first electric power value and a second electric power value higher than the first electric power value to thereby light the light source lamp, and a cooling control section adapted to control the cooling device, and the cooling control section controls the cooling device so that the cooling fluid at a flow rate lower than a set flow rate set in accordance with the second electric power value is fed to the light source lamp during a predetermined period after the lamp electric power is switched from the first electric power value to the second electric power value.

8 Claims, 6 Drawing Sheets

(56) References Cited

U.S. PATENT DOCUMENTS

| | | | |
|---|---|---|---|
| 2009/0195756 A1* | 8/2009 | Li et al. | 353/54 |
| 2009/0290131 A1* | 11/2009 | Kim et al. | 353/61 |
| 2010/0164383 A1 | 7/2010 | Munters et al. | |
| 2011/0037954 A1* | 2/2011 | Tsuchiya et al. | 353/54 |

FOREIGN PATENT DOCUMENTS

| | | |
|---|---|---|
| JP | A-2003-295320 | 10/2003 |
| JP | A-2007-256570 | 10/2007 |
| JP | A-2007-328005 | 12/2007 |
| JP | A-2010-500730 | 1/2010 |

\* cited by examiner

PROJECTOR

TECHNICAL FIELD

The present invention relates to a projector.

BACKGROUND ART

In the past, there has been known a projector, which modulates a light beam emitted from a light source to thereby form an image corresponding to image information, and project the image on a projection target surface such as a screen in an enlarged manner. As such a light source, there is often used a light source lamp (a light emitting tube) such as a super-high pressure mercury lamp provided with a light emitting tube having a discharge space inside with a pair of electrodes and a light emitting substance encapsulated.

Here, in the rated lighting state in which the light source lamp is lighted at the rated power, the mercury in the discharge space exists in the form of vapor. It can be said that this state is a state exceeding a saturation threshold level. In contrast, in the case of, for example, displaying a dark image, if the lamp electric power is reduced to thereby decrease the luminance of the light source lamp, the temperature in the discharge space drops to be lower than in the rated lighting state and becomes lower than the saturation threshold level, and thus the mercury vapor is compressed to thereby cause the state in which the pressure in the discharge space is lowered. In such a state, it becomes difficult for the halogen cycle, in which the tungsten evaporated from the electrode returns to the electrode, to appropriately function, and thus it becomes easy for the blackening, in which the tungsten is attached to the inner wall of the light emitting tube, to occur. Such blackening lowers the luminance of the light source lamp to thereby shorten the product life of the light source lamp.

Therefore, there has been known a projector (a projector system) capable of preventing the blackening from occurring (see, e.g., PTL 1).

In the projector described in PTL 1, when the period of a dimming operation mode for lighting the light source lamp with low lamp electric power exceeds a predetermined time, there occurs transition to a restoring period in which the lamp electric power is increased to be higher than the saturation threshold level. Thus, the temperature in the discharge space rises to thereby eliminate the blackening accumulated, and therefore, a further operation of the light source lamp in the dimming operation mode becomes possible.

CITATION LIST

Patent Literature

PTL 1: JP-T-2010-500730

SUMMARY OF INVENTION

Technical Problem

However, in the projector described in PTL 1, since the light source lamp is lighted in an operation mode (an operation mode with high lamp electric power) not intended by the user during the restoring period, there arises a problem that the luminance of the image displayed is raised without intent of the user.

In order to eliminate such a problem, it is possible to provide a dimming device for reducing the light intensity used for forming the image. However, since there arises a necessity of performing the light intensity control in accordance with the operation mode, the internal configuration and the process of the projector become complicated.

Further, in the restoring period, there arises a necessity of increasing the rotational speed (the number of revolutions per unit time) of a fan for feeding cooling air to the light source lamp compared to that in the time of the dimming operation made so that the temperature of the light source lamp does not rise beyond necessity. However, in this case, there arises a problem that the noise such as wind noise of the fan increases.

In view of these problems, there have been demanded other efficient measures for preventing the accumulation of the blackening.

Solution to Problem

An advantage of some aspects of the invention is to provide a projector capable of efficiently preventing the accumulation of the blackening.

An aspect of the invention is directed to a projector including a light source lamp adapted to emit light in accordance with a lamp electric power supplied, a light modulation device adapted to modulate the light emitted from the light source lamp, a projection optical device adapted to project the light modulated, a cooling device adapted to feed a cooling fluid to the light source lamp to thereby cool the light source lamp, a lighting control section adapted to supply the light source lamp with the lamp electric power having either one of a first electric power value and a second electric power value higher than the first electric power value to thereby light the light source lamp, and a cooling control section adapted to control the cooling device, and the cooling control section controls the cooling device so that the cooling fluid at a flow rate lower than a set flow rate set in accordance with the second electric power value is fed to the light source lamp during a predetermined period after the lamp electric power supplied to the light source lamp is switched from the first electric power value to the second electric power value.

According to the aspect of the invention, in the case in which the electric power value of the lamp electric power supplied to the light source lamp is switched from the first electric power value to the second electric power value, the cooling fluid at a flow rate lower than the set flow rate set in accordance with the second electric power value is fed to the light source lamp during the predetermined period after the transition to the second electric power value. According to this process, the rise in temperature of the light source lamp can promptly be performed compared to the case in which the cooling fluid corresponding to the set flow rate is fed to the light source lamp. Therefore, it is possible to make it easy to eliminate the blackening inside the light source lamp caused by the first electric power value, and the accumulation of the blackening can efficiently be prevented.

In the aspect of the invention, it is preferable that the cooling device is controlled to feed the cooling fluid at a flow rate corresponding to the set flow rate to the light source lamp after the predetermined period elapses.

According to the above configuration, since the cooling fluid at the set flow rate corresponding to the second electric power value is fed to the light source lamp after the predetermined period elapses, the excessive rise in temperature of the light source lamp can be prevented, and thus it is possible to stably light the light source lamp.

In the aspect of the invention, it is preferable that the cooling control section includes a period setting section adapted to set the predetermined period based on the set flow rate. It is also possible that the cooling control section includes a period setting section adapted to set the predetermined period based on a difference between the first electric power value and the second electric power value. It is also possible that the cooling control section includes a period setting section adapted to set the predetermined period based on a time period during which the lamp electric power of the first electric power value is supplied. It is also possible that the cooling control section includes a period setting section adapted to set the predetermined period based on a voltage level of the lamp electric power of the second electric power value.

Here, if the state in which the temperature of the light source lamp is excessively high continues, loss of clarity is incurred, and thus the operation life of the light source lamp is shortened.

In contrast, although it is possible to cool the light source lamp to the appropriate temperature corresponding to the second electric power value in a short period of time after the predetermined period described above elapses if the set flow rate corresponding to the second electric power value is high, if the set flow rate is low, the time period becomes longer.

Further, although it is possible to cool it to the appropriate temperature described above in a short period of time if the difference between the first electric power value and the second electric power value is small, if the difference in electric power is large, the time period becomes longer.

Further, although it is required only a short period of time (elimination time) for maintaining the high temperature state to thereby eliminate the blackening if the duration time during which the lamp electric power of the first electric power value is supplied is short, if the duration time is longer, the amount of accumulation of the blackening increases, and therefore, the elimination time becomes longer.

In addition, when supplying the lamp electric power of the same electric power value, if the voltage level applied to the light source lamp is high, the elimination time described above can be short since it is not a condition of easily causing the blackening. However, if the voltage level is low, the elimination time becomes longer since it is the condition of easily causing the blackening of the light source lamp.

In contrast, according to the above configuration, the period setting section sets the predetermined period described above based on at least either one of the set flow rate corresponding to the second electric power value, the difference between the first electric power value and the second electric power value, the supply time period of the lamp electric power of the first electric power value, and the voltage level of the lamp electric power of the second electric power value. According to this process, since the predetermined period in which the light source lamp becomes in the high temperature state for eliminating the blackening can appropriately be set, it is possible to prevent the high temperature state from continuing excessively. Therefore, the accumulation of the blackening can efficiently be prevented, and in addition, it is possible to stabilize the lighting of the light source lamp, and thus the longer operating life of the light source lamp can be achieved.

In the aspect of the invention, it is preferable that the cooling control section sets a period during which the cooling device is halted in the predetermined period.

According to the above configuration, it results that the cooling fluid does not feed to the light source lamp, and the light source lamp is not cooled during the period in which the cooling device is halted. According to this process, the rise in temperature of the light source lamp can more promptly be performed. Therefore, the blackening can promptly be eliminated. Further, since the cooling device is halted in the period, the generation of the noise due to the drive of the cooling device can be prevented.

In the aspect of the invention, it is preferable that the cooling device includes a fan adapted to feed the cooling fluid, and the cooling control section controls the fan to gradually increase the flow rate of the cooling fluid fed to the light source lamp within a range failing to reach the set flow rate during the predetermined period.

It should be noted that gradually increasing the flow rate of the cooling fluid includes increasing the flow rate in a stepwise manner and increasing the flow rate as the time elapses linearly or in a curved manner based on a predetermined function.

Here, if the rotational speed (the number of revolutions per unit time) of the fan rapidly increases, the wind noise due to the drive of the fan becomes large to thereby make the noise thus generated larger.

In contrast, according to the above configuration, since the drive of the fan is controlled so that the flow rate of the cooling fluid gradually increases, it results that the rotational speed of the fan is gradually increased. According to this process, the noise due to the drive of the fan can be reduced compared to the case in which the rotational speed of the fan rapidly increases.

DESCRIPTION OF EMBODIMENTS

First Embodiment

A first embodiment of the invention will hereinafter be explained with reference to the accompanying drawings.

Figure 1:
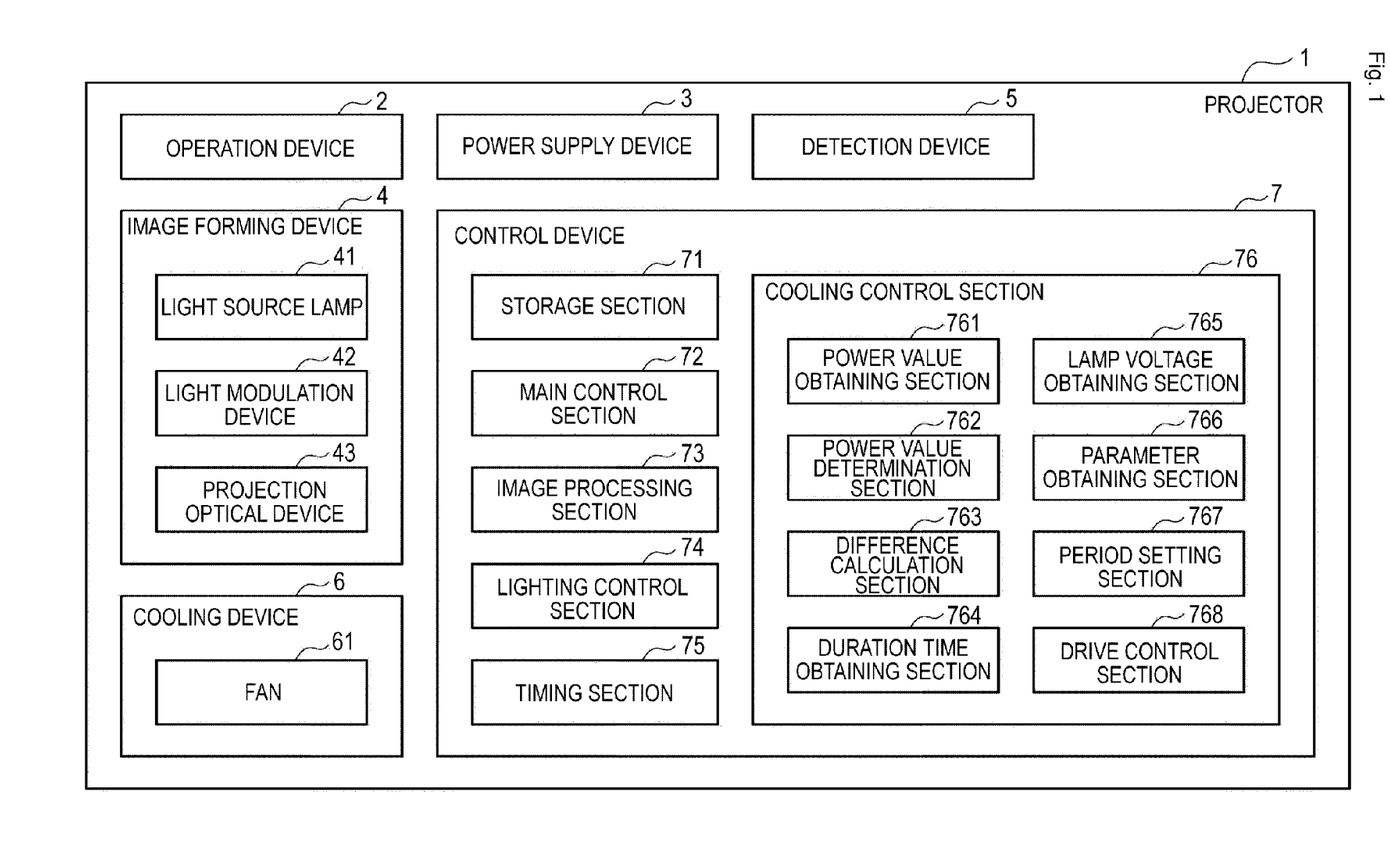
FIG. 1 is a block diagram showing a configuration of a projector according to a first embodiment of the invention.

FIG. 1 is a block diagram showing a configuration of a projector 1 according to the present embodiment.

The projector 1 according to the present embodiment modulates the light beam emitted from a light source lamp 41 to thereby from an image corresponding to image information, and then projects the image on the projection target surface such as a screen in an enlarged manner. When the electric power value (hereinafter abbreviated as a "lamp electric power value" in some cases) of the lamp electric power supplied to the light source lamp 41 is raised, the projector 1 feeds cooling air at a flow rate lower than a set flow rate set in advance in accordance with a high electric power value to the light source lamp 41 for a predetermined period of time after the electric power value has been switched to thereby promptly perform rise in temperature of the light source lamp 41 and thus prevent accumulation of blackening inside the light source lamp 41.

As shown in FIG. 1, such a projector 1 is provided with an operation device 2, a power supply device 3, an image forming device 4, a detection device 5, a cooling device 6, and a control device 7.

The operation device 2 is formed of an operation panel disposed on, for example, a top surface of the projector 1. The operation panel is provided with a plurality of keys, and outputs an operation signal corresponding to the key input to the control device 7. As such keys, there can be cited a power key for switching ON/OFF the power of the projector 1, a switching key for switching a color mode, a mute key for displaying a predetermined image (e.g., a black image) instead of the display of the image corresponding to the image information input thereto, and so on.

The power supply device 3 supplies each of the electronic components constituting the projector 1 with electric power. Specifically, the power supply device 3 supplies the control device 7 with the electric power, and further supplies each of the electronic components (e.g., a light source lamp 41 described later) with the electric power under the control of the control device 7.

The image forming device 4 modulates the light in accordance with the drive signal input from the control device 7, and then projects the light on the projection target surface in an enlarged manner. The image forming device 4 is provided with a light source lamp 41, a light modulation device 42, and a projection optical device 43.

Although the detailed illustration is omitted, the light source lamp 41 is provided with a light emitting tube having a discharge space with a pair of electrodes and a light emitting substance encapsulated therein, and a reflector attached to the light emitting tube. Among these constituents, the light emitting tube lights at a luminance corresponding to the lamp electric power supplied from the power supply device 3.

The light modulation device 42 modulates the light beam, which is emitted from the light source lamp 41, in accordance with the drive signal described above. As such a light modulation device 42, a liquid crystal panel can be adopted, and in addition thereto, a device using a micromirror can also be adopted, for example.

The projection optical device 43 is for projecting the light modulated in an enlarged manner, and is configured as a combination lens provided with a body tube and a plurality of lenses housed in the body tube.

The detection device 5 is connected to the power supply device 3, and detects the voltage level of the lamp electric power supplied by the power supply device 3. Further, the detection device 5 outputs the voltage level thus detected to the control device 7.

The cooling device 6 feeds the cooling air as a cooling fluid introduced from the outside of the projector 1 to the various types of heat-generating components constituting the projector 1 to thereby cool these components. For example, the cooling device 6 feeds the cooling air to the light source lamp 41 to thereby cool the light source lamp 41. Such a cooling device 6 has a fan 61 for discharging the cooling air.

Configuration of Control Device

The control device 7 is formed of a circuit board having a central processing unit (CPU), a random access memory (RAM), a flash memory, and so on mounted thereon, and controls the operation of the projector 1 in accordance with the input operation by the user to the operation device 2 or in an autonomous manner. Such a control device 7 has a storage section 71, a main control section 72 realized by the CPU processing a program and data stored in the storage section 71, an image processing section 73, a lighting control section 74, a timing section 75, and a cooling control section 76.

Configuration of Storage Section

The storage section 71 is formed of the flash memory described above, and stores various programs and data necessary for the operation of the projector 1. For example, as such data, the storage section 71 stores a drive parameter of the cooling device 6 corresponding to the lamp electric power value. The drive parameter is set based on the flow rate (set flow rate) of the cooling air to be fed to the light source lamp 41, and is stored as a fan voltage corresponding to each of the lamp electric power values in the case of controlling the drive of the fan 61 of the cooling device 6 with the applied voltage level, or as a duty ratio corresponding to each of the lamp electric power values in the case of controlling the drive of the fan 61 using pulse width modulation (PWM).

It should be noted that the explanation will be described below assuming that the drive of the fan 61 is controlled using the applied voltage level.

Further, in the case in which the lamp electric power value supplied to the light source lamp 41 is switched from a low level to a high level, the storage section 71 stores reference time corresponding to the difference between these electric power values. The reference time is the time used as the reference of a delay period (corresponding to a predetermined period according to the invention) for which the operation of the cooling device 6 corresponding to the drive parameter corresponding to the high lamp electric power value thus switched to is delayed by the cooling control section 76 described later. The larger the difference between the electric power values is, the longer such a reference time is set, and the smaller the difference is, the shorter the reference time is set.

Besides the above, the storage section 71 stores a lamp voltage (a reference lamp voltage) obtained when the light source lamp 41 is supplied with the lamp electric power with a certain electric power value in the condition in which the light source lamp 41 is not deteriorated. The reference lamp voltage is stored for each of the lamp electric power values with which the light source lamp 41 can be lighted, and is stored to the storage section 71 in a shipping stage of the projector 1.

Further, although the details will be described later, the storage section 71 stores the time (duration time) timed by the timing section 75.

Configuration of Main Control Section

The main control section 72 controls the operation of the control device 7, and consequently controls the overall operation of the projector 1. For example, the main control section 72 controls the lighting control section 74 so that the light source lamp 41 is supplied with the lamp electric power of the electric power value set in accordance with the execution state of the mute function, the average picture level (APL) of the image generated by the image processing section 73 described later, and the color mode set by the user.

Further when changing the lamp electric power value, the main control section 72 obtains the time (the duration time) timed by the timing section 75 described later and then stores the time to the storage section 71, and then resets the time counted by the timing section 75 to thereby make the timing section 75 start timing from "0."

Configuration of Image Processing Section

The image processing section 73 develops an image, which corresponds to the image information (including the image signal and the image data) received from external equipment such as a PC, in a video memory not shown to thereby generate the image. On this occasion, the image processing section 73 performs a predetermined correction process on the image. Further, the image processing section 73 outputs the drive signal corresponding to the image thus generated to the image forming device 4 described above.

Configuration of Lighting Control Section

The lighting control section 74 controls the operation of the power supply device 3 based on the control signal input from the main control section 72 to make the power supply device 3 supply the light source lamp 41 with the lamp electric power to thereby light the light source lamp 41. In other words, the lighting control section 74 controls the operation of the power supply device 3 so that the light source lamp 41 is supplied with the lamp electric power of the electric power value based on the control signal. Such a lamp electric power value is set in a range of 70 through 230 W (watts) in the present embodiment, but can arbitrarily be changed in accordance with, for example, the type of the light source lamp 41.

Configuration of Timing Section

The timing section 75 measures the time elapsed from when the lamp electric power value has been changed under the control of the main control section 72. Specifically, when a start signal is input from the main control section 72 (i.e., when the change in the target power value described later is performed), the timing section 75 starts timing from "0," and further, when a stop signal is input from the main control section 72, the timing section 75 stops the timing. Further, the time measured by the timing section 75 is stored in the storage section 71 by the main control section 72 as a duration time of the lamp electric power value before the change, and the measurement by the timing section 75 is started from "0" again in accordance with the subsequent input of the start signal.

Configuration of Cooling Control Section

The cooling control section 76 controls the cooling device 6 to feed the cooling air for cooling the constituents (e.g., the light source lamp 41 and the power supply device 3) of the projector 1. In particular, the cooling control section 76 feeds the cooling air for cooling the light source lamp 41 based on the control signal input from the main control section 72.

In the case in which the lamp electric power value is switched by the main control section 72, and the lamp electric power value (the target power value) after the switching is higher than the lamp electric power value (the previous power value) before the switching, such a cooling control section 76 delays the operation of the cooling device 6 based on the drive parameter corresponding to the target power value. In other words, the cooling control section 76 controls the cooling device 6 to feed the cooling air at a flow rate lower than the set flow rate corresponding to the target power value for a predetermined period (the delay period) after the target power value has become higher than the previous power value. Thus, the rise in temperature in the discharge space of the light source lamp 41 is promoted to thereby eliminate the blackening caused in the discharge space.

In order to realize such a function, the cooling control section 76 has a power value obtaining section 761, a power value determination section 762, a difference calculation section 763, a duration time obtaining section 764, a lamp voltage obtaining section 765, a parameter obtaining section 766, a period setting section 767, and a drive control section 768.

The power value obtaining section 761 obtains the lamp electric power value supplied to the light source lamp 41 based on the control signal (the same as the control signal input to the lighting control section 74) input from the main control section 72. Then, the power value obtaining section 761 stores the lamp electric power values thus obtained in the storage section 71 in chronological order.

The power value determination section 762 refers to the storage section 71 to determines whether or not the lamp electric power value obtained by the power value obtaining section 761 changes with respect to the previous lamp electric power value. Then, if it is determined that the lamp electric power value has changed, the power value determination section 762 determines whether or not the lamp electric power value (the target power value) thus obtained is higher than the lamp electric power value (the previous power value) before the change.

The difference calculation section 763, the duration time obtaining section 764, the lamp voltage obtaining section 765, the parameter obtaining section 766, and the period setting section 767 operate if the power value determination section 762 determines that the target power value is higher than the previous power value. In other words, these functional sections 763 through 767 operate in the case of switching from the state of supplying the lamp electric power with the low power value (corresponding to a first power value according to the invention) to the state of supplying the lamp electric power with the high power value (corresponding to a second power value according to the invention).

The difference calculation section 763 calculates the difference between the target power value and the previous power value.

The duration time obtaining section 764 obtains the duration time of the previous power value, which has been measured by the timing section 75 and then stored to the storage section 71 by the main control section 72.

The lamp voltage obtaining section 765 obtains the lamp voltage detected by the detection device 5.

The parameter obtaining section 766 obtains the drive parameter corresponding to the target power value from the storage section 71.

Figure 2:
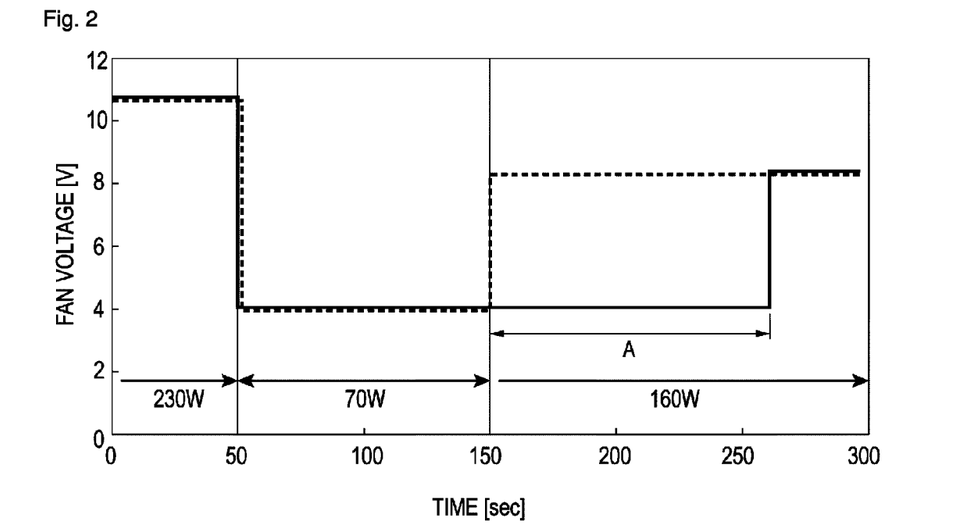
FIG. 2 is a diagram showing variations in a lamp electric power value and a fan voltage value in the first embodiment.
Figure 3:
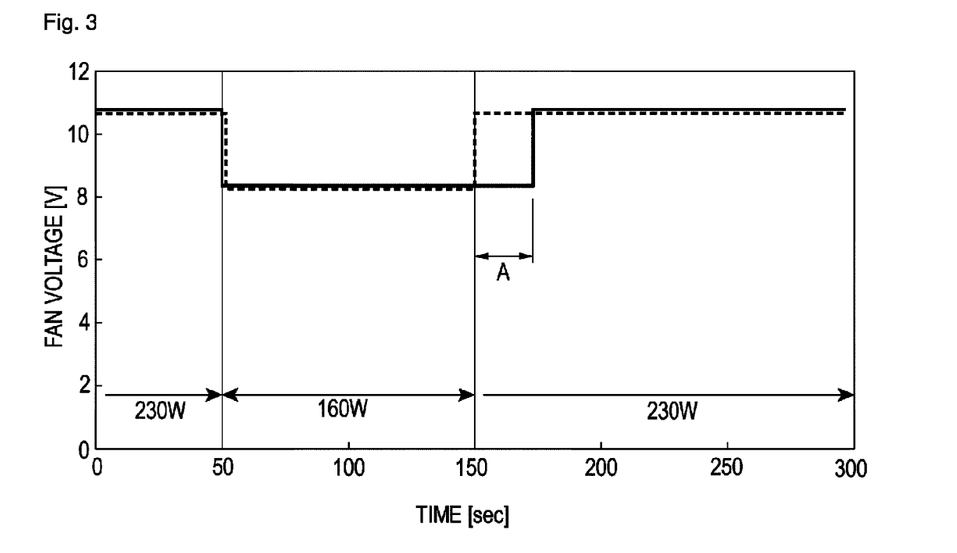
FIG. 3 is a diagram showing variations in the lamp electric power value and the fan voltage value in the first embodiment.
Figure 4:
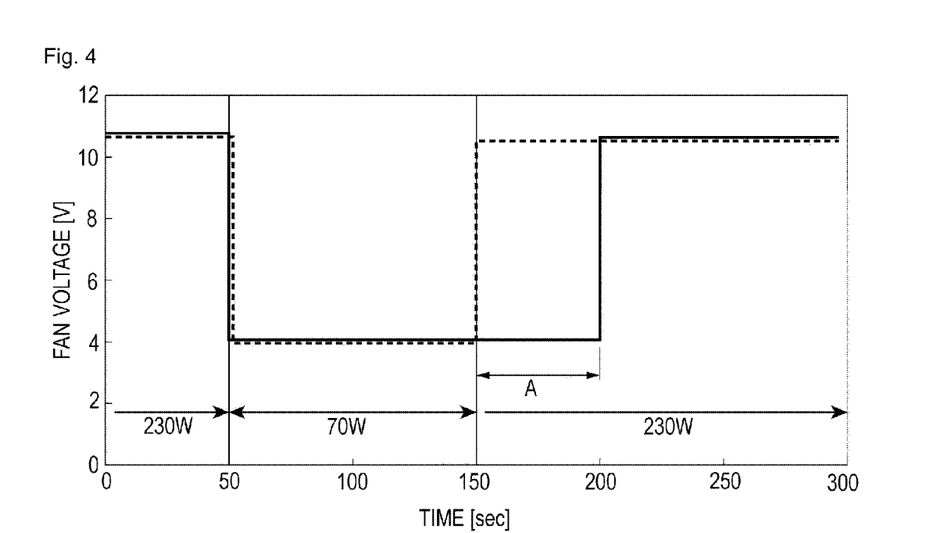
FIG. 4 is a diagram showing variations in the lamp electric power value and the fan voltage value in the first embodiment.

FIGS. 2 through 4 are diagrams showing the variation in the fan voltage value in the case in which the lamp electric power value is changed from 70 W to 160 W, from 160 W to 230 W, and from 70 W to 230 W, respectively. It should be noted that in FIGS. 2 through 4, the transition of the fan voltage corresponding to the target power value is indicated by a dotted line as a comparative example, and the transition of the fan voltage applied to the fan 61 due to the control by the cooling control section 76 is indicated by a solid line as an executed example.

The period setting section 767 sets the delay period based on the duration time, the lamp voltage, and the drive parameter thus obtained, and the difference thus calculated. The delay period is a time period for which the operation of the cooling device 6 with the drive parameter corresponding to the lamp electric power value after the change is delayed.

Specifically, the period setting section 767 obtains the reference time corresponding to the difference between the target power value and the previous power value from the storage section 71, then reduces or extends the reference time based on the duration time, the lamp voltage, and the drive parameter described above to thereby set the delay period (the period indicated by A in FIGS. 2 through 4).

For example, as shown in FIG. 2, if the target power value is changed to 160 W higher than 70 W as the previous power value, the period setting section 767 sets the delay period A as a period starting at the change in the target power value for which the fan voltage (the fan voltage of 4.0V indicated by the solid line in FIG. 2) corresponding to the previous power value is continued instead of the fan voltage (the fan voltage of 8.3V indicated by the dotted line in FIG. 2) for feeding the cooling air at the set flow rate corresponding to the target power value.

Similarly, as shown in FIG. 3, if the target power value is changed to 230 W higher than 160 W as the previous power value, the period setting section 767 sets the delay period A as a period for which the fan voltage (the fan voltage of 8.3V indicated by the solid line in FIG. 3) corresponding to the previous power value is continued instead of the fan voltage (the fan voltage of 10.9V indicated by the dotted line in FIG. 3) for feeding the cooling air at the set flow rate corresponding to the target power value.

Further, as shown in FIG. 4, if the target power value is changed to 230 W higher than 70 W as the previous power value, the period setting section 767 sets the delay period A as a period for which the fan voltage (the fan voltage of 4.0V indicated by the solid line in FIG. 4) corresponding to the previous power value is continued instead of the fan voltage (the fan voltage of 10.9V indicated by the dotted line in FIG. 4) corresponding to the target power value.

As shown in FIGS. 2 through 4, the period setting section 767 sets the delay period A to be longer if the power difference between the previous power value and the target power value changed is larger, and shorter if it is smaller. Further, the delay period A is set to be longer if the previous power value is lower, and shorter if it is higher.

Figure 5:
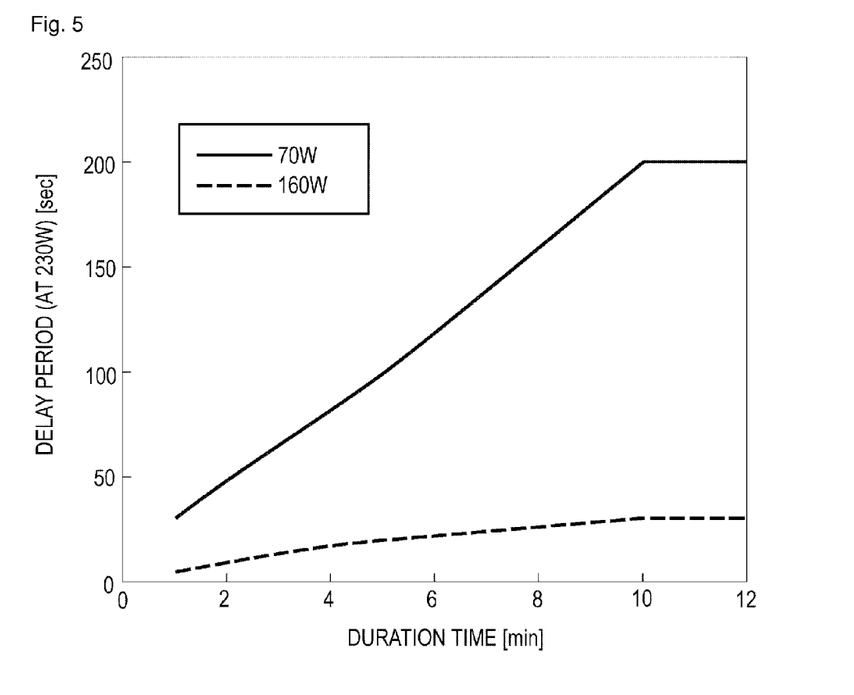
FIG. 5 is a diagram showing a relationship between duration time and delay period in the first embodiment.

FIG. 5 is a diagram showing the length of the delay period with respect to the length of the duration time. It should be noted that in FIG. 5, it is assumed that the target power value is 230 W, and the case with the previous power value of 70 W is illustrated by the solid line while the case with the previous power value of 160 W is illustrated by the dotted line.

Further, for example, the period setting section 767 reduces or extends the reference time in accordance with the proportion of the duration time to a predetermined time period to thereby set the delay period. The predetermined time period is set in accordance with, for example, the type of the light source lamp 41.

Thus, as shown in FIG. 5, in the case in which the target power value is 230 W and the previous power value is 70 W, if the duration time during which the lamp electric power of the previous power value is supplied is 2 minutes (min), the delay period is set to 50 seconds (sec), and if the duration time is 6 minutes, the delay period is set to 120 seconds. Further, in the case in which the target power value is 230 W and the previous power value is 160 W, if the duration time during which the lamp electric power of the previous power value is supplied is 8 minutes, the delay period is set to 25 seconds (sec).

It should be noted that if the duration time becomes equal to or longer than 10 minutes, the delay period is set to substantially the same value as in the case in which the duration time is 10 minutes. Further, as shown in FIG. 5, if the duration time is shorter than 1 minute, reduction or extension of the reference time corresponding to the duration time is not performed.

Returning to FIG. 1, the period setting section 767 extends the reference time in accordance with the proportion of the lamp voltage obtained by the lamp voltage obtaining section 765 to the reference lamp voltage, which is stored in the storage section 71 and corresponds to the target power value, to thereby set the delay period.

Here, the variation in the lamp voltage in the case of supplying the lamp electric power of a certain electric power value can be used as indicator of the arc length formed between the electrodes of the light source lamp 41. Specifically, a high lamp voltage represents a long arc length, and denotes that there arises a condition in which the blackening is hard to occur. In contrast, drop of the lamp voltage represents decrease in the arc length, and denotes that there arises a condition in which the blackening is easy to occur.

Therefore, in the case in which, for example, the reference lamp voltage corresponding to the target power value of 230 W is 100V, the period setting section 767 sets the delay period to the time obtained by multiplying the reference time by 1.5 if the lamp voltage obtained is 70V, or to the time obtained by doubling the reference time if the lamp voltage obtained is 60V.

It should be noted that in the case in which the reference lamp voltage corresponding to the target power value of 230 W is 100V, and the lamp voltage thus obtained is in a range of 80 through 100V, the period setting section 767 sets the delay period without extending the reference time.

Further, the period setting section 767 sets the delay period by reducing or extending the reference time in accordance with the drive parameter thus obtained. Since the drive parameter corresponds to the flow rate of the cooling air fed from the cooling device 6 to the light source lamp 41 as described above, the period setting section 767 sets the delay period by reducing or extending the reference time in accordance with the flow rate of the cooling air indicated by the drive parameter.

In other words, the period setting section 767 sets the delay period by reducing or extending the reference time in accordance with the proportion of the flow rate of the cooling air indicated by the drive parameter thus obtained to a predetermined flow rate. Therefore, if the flow rate indicated by the drive parameter is lower than the predetermined flow rate, the delay period reduced in accordance with the proportion of the flow rate to the predetermined flow rate is set.

As described above, the period setting section 767 sets the time period obtained by reducing or extending the reference time in accordance with the duration time, the lamp voltage, and the drive parameter as the delay period.

The drive control section 768 controls the cooling device 6 so that the cooling air at the set flow rate corresponding to the lamp electric power value is fed to the light source lamp 41.

Specifically, if the target power value is lower than the previous power value, the drive control section 768 obtains the drive parameter corresponding to the target power value from the storage section 71, and then controls the operation of the cooling device 6 based on the drive parameter from the time point of the transition to the target power value.

Rise in Temperature of Light Source Lamp

Figure 6:
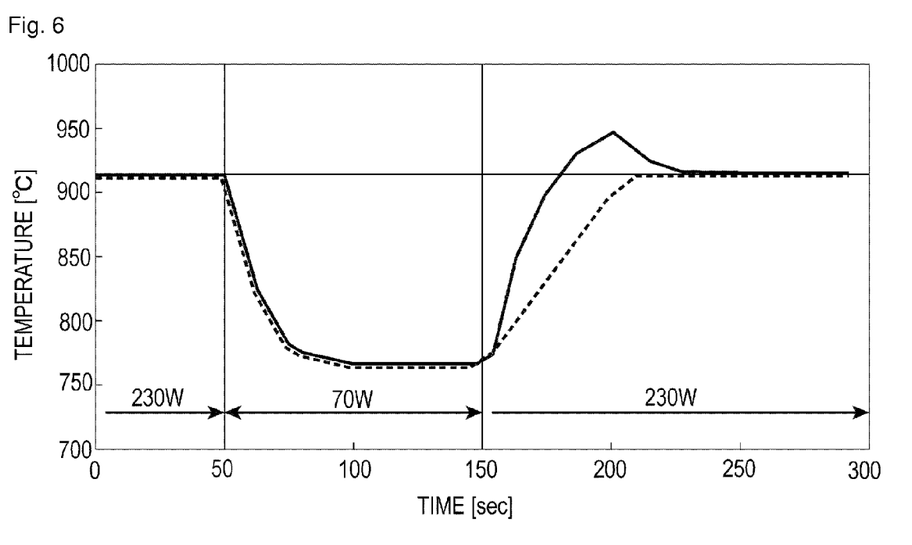
FIG. 6 is a diagram showing rise in temperature of the light source lamp in the first embodiment.

FIG. 6 is a diagram showing the rise in temperature of the light source lamp 41 in the case in which the operation mode of the light source lamp 41 is changed from a low luminance mode to a high luminance mode.

In contrast, if the target power value is higher than the previous power value, the drive control section 768 controls the operation of the cooling device 6 based on the drive parameter corresponding to the previous power value from the time point of the transition to the target power value until the delay period thus set elapses. Therefore, in the case of supplying the lamp electric power of the target power value higher than the previous power value, by temporarily preventing cooling of the light source lamp 41, the rise in temperature in the discharge space is performed promptly compared to the case of providing no delay period (the case indicated by the dotted line in FIG. 6) as indicated by the solid line in FIG. 6. Thus, the blackening having occurred when supplying the lamp electric power of the previous power value is eliminated.

Subsequently, after the delay period has elapsed, the drive control section 768 controls the operation of the cooling device 6 based on the drive parameter corresponding to the target power value. Thus, it results that the cooling air at the set flow rate corresponding to the target power value is fed to the light source lamp 41, and the light source lamp 41 is cooled to the temperature suitable for the target power value. Therefore, the lighting of the light source lamp 41 can be stabilized, and in addition, longer operating life thereof can be achieved. Further, since the rise in temperature of the light source lamp 41 is performed promptly, the lighting response of the light source lamp 41 can be improved.

Cooling Control Process

Figure 7:
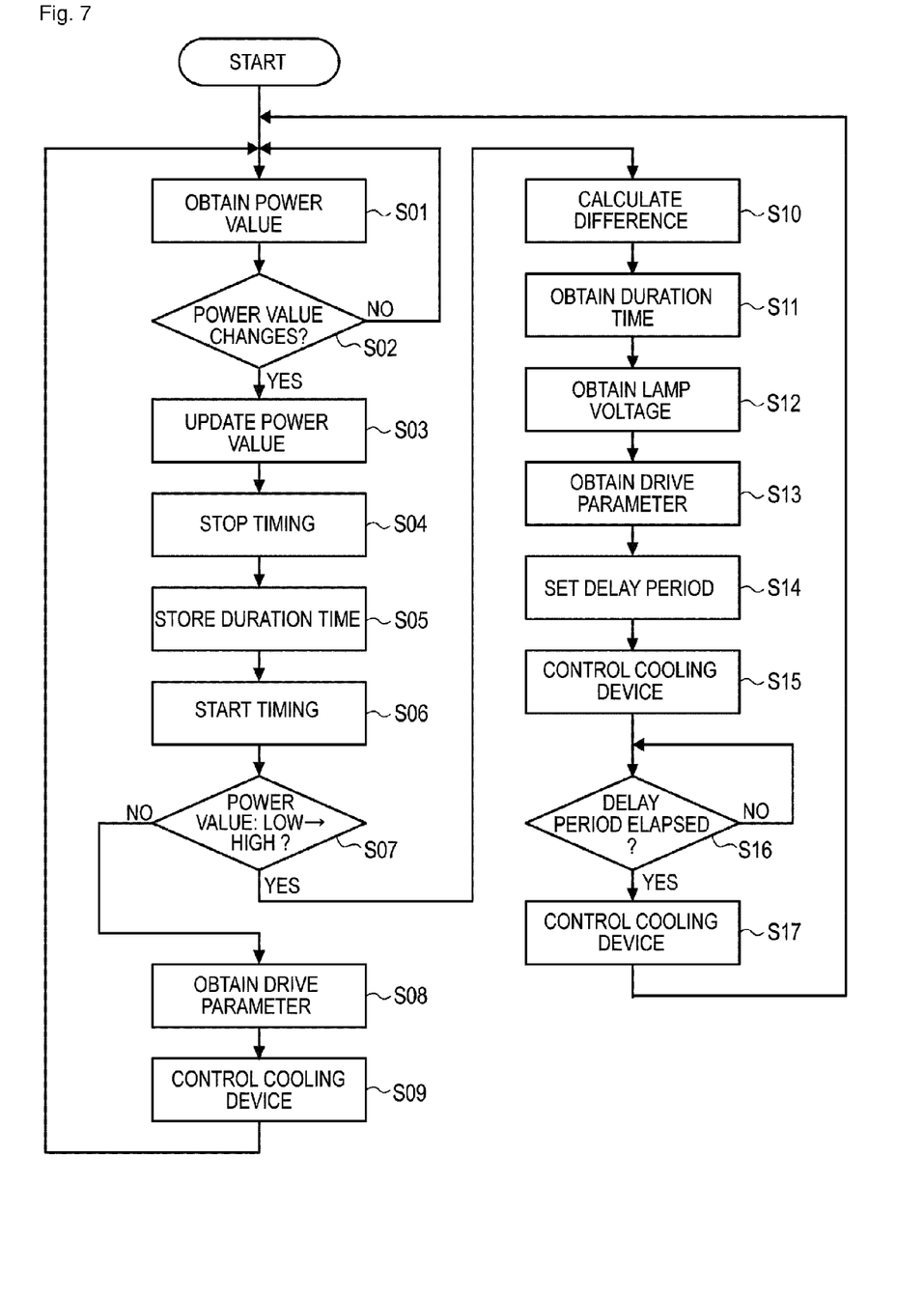
FIG. 7 is a flowchart showing a cooling control process in the first embodiment.

FIG. 7 is a flowchart showing a cooling control process executed by the control device 7.

The control device 7 processes the program stored in the storage section 71 during the period in which the power of the projector 1 is kept ON to thereby execute the cooling control process described below, and thus controls the operation of the cooling device 6 to thereby cool the light source lamp 41.

As shown in FIG. 7, in the cooling control process, firstly, the power value obtaining section 761 obtains (step S01) the lamp electric power value (the target power value) supplied to the light source lamp 41 based on the control signal input from the main control section 72.

Then, the power value determination section 762 determines (step S02) whether or not the target power value changes from the previous lamp electric power value (the previous power value) stored in the storage section 71, namely whether or not the target power value is different from the previous power value.

If it is determined in the determination process of the step S02 that the target power value does not change, the control device 7 returns the process to the step S01.

In contrast, if it is determined in the determination process of the step S02 that the target power value has changed, the power value obtaining section 761 stores (step S03) the target power value in the storage section 71.

In conjunction with the execution of the step S03, the main control section 72 outputs a halt signal to the timing section 75 to thereby stop (step S04) timing by the timing section 75.

Subsequently, the main control section 72 obtains the measured time of the timing section 75 thus stopped, and then stores (step S05) the measured time in the storage section 71 as the duration time.

Further, the main control section 72 outputs a start signal to the timing section 75 to make (step S06) the timing section 75 start timing from "0." Thus, the elapsed time from when the change in the target power value is performed is measured by the timing section 75. It should be noted that it is also possible to configure that the step S06 is executed when the control by the drive control section 768 in the step S15 described later is started, and the elapsed time from the start of the control is measured.

Subsequently, the power value determination section 762 determines (step S07) whether or not the target power value is higher than the previous power value.

Here, if it is determined that the target power value is not higher than the previous power value (if it is determined that the target power value is lower than the previous power value), setting of the delay period by the period setting section 767 is not performed, and the drive control section 768 obtains (step S08) the drive parameter corresponding to the target power value from the storage section 71.

Then, the drive control section 768 controls (step S09) the operation of the cooling device 6 based on the drive parameter, and then the control device 7 returns the process to the step S01.

On the other hand, if it is determined in the determination process of the step S07 that the target power value is higher than the previous power value, the difference calculation section 763 calculates (step S10) the difference between the target power value and the previous power value.

Further, the duration time obtaining section 764 obtains the duration time stored in the storage section 71 in the step S05, the lamp voltage obtaining section 765 obtains the lamp voltage detected by the detection device 5, and further the parameter obtaining section 766 obtains the drive parameter corresponding to the target power value from the storage section 71 (steps S11 through S13).

Subsequently, the period setting section 767 sets (step S14) the delay period based on the difference thus calculated, the duration time, the lamp voltage, and the drive parameter thus obtained in the steps S10 through S13 as described above.

Then, the drive control section 768 continues (step S15) the control of the operation of the cooling device 6 based on the drive parameter corresponding to the previous power value, and at the same time, determines (step S16) whether or not the delay period thus calculated in the step S11 has elapsed after the transition to the target power value.

If the drive control section 768 determines in the determination process of the step S16 that the delay period has not yet elapsed, the determination process of the step S13 is repeated. Therefore, the drive control section 768 continues to execute the control of the operation of the cooling device 6 in the step S15, namely the control with the drive parameter corresponding to the previous power value. Thus, the flow rate of the cooling air fed to the light source lamp 41 is reduced compared to the set flow rate of the cooling air fed in accordance with the target power value, and therefore, the rise in temperature of the light source lamp 41 is promptly performed.

In contrast, if the drive control section 768 determines in the determination process of the step S16 that the delay period has elapsed, the drive control section 768 performs (step S17) the control of the operation of the cooling device 6 based on the drive parameter corresponding to the target power value. Then, while executing the step S17, the control device 7 returns the process to the step S01.

By executing the step S17 to thereby feed the cooling air at the set flow rate corresponding to the target power value to the light source lamp 41, the excessive rise in temperature of the light source lamp 41 can be prevented.

According to the projector 1 of the present embodiment explained hereinabove, the following advantages can be obtained.

In the case in which the lamp electric power value supplied to the light source lamp 41 is switched to a higher electric power value, the cooling air at the flow rate lower than the set flow rate corresponding to the lamp electric power value is fed to the light source lamp 41 in the period from when the lamp electric power value is switched to the present lamp electric power value to when the delay time elapses. According to this configuration, the rise in temperature of the light source lamp 41 can be performed promptly compared to the case in which the cooling air at the set flow rate corresponding to the lamp electric power value is fed to the light source lamp 41 from the time point of the transition of the lamp electric power value. Therefore, it is possible to make it easy to eliminate the blackening inside the light source lamp caused by continuously supplying the lamp electric power of the low lamp electric power value, and the accumulation of the blackening can efficiently be prevented.

Further, since the cooling air at the set flow rate corresponding to the target power value is fed to the light source lamp 41 after the delay period has elapsed, the light source lamp 41 can be cooled to the appropriate temperature. Therefore, loss of clarity can be prevented from occurring in the light source lamp 41, and the light source lamp 41 can be lighted stably. Further, since the operation of the cooling device 6 can temporarily be prevented, the power consumption of the projector 1 can be reduced during the delay period.

The period setting section 767, which functions in the case in which the target power value is higher than the previous power value, sets the delay period based on the drive parameter corresponding to the set flow rate corresponding to the target power value, the difference between the previous power value and the target power value, the duration time of the previous power value, and the voltage level when the lamp electric power of the target power value is actually supplied. According to this configuration, the delay period during which the discharge space becomes in the high temperature state for eliminating the blackening can appropriately be set. Therefore, the accumulation of the blackening can efficiently be prevented.

Besides the above, since the delay period can be prevented from becoming excessively long, the condition in which the temperature of the light source lamp 41 is excessively high can be prevented from continuing. Therefore, the lighting of the light source lamp 41 can further be stabilized, and the longer operating life of the light source lamp 41 can be achieved.

Second Embodiment

Hereinafter, a second embodiment of the invention will be explained.

The projector according to the present embodiment is provided with substantially the same configuration as that of the projector 1 described above. Here, in the projector 1, the drive control section 768 controls the operation of the cooling device 6 based on the drive parameter corresponding to the previous power value for the delay period. In contrast, the projector according to the present embodiment is provided with a halt period for halting the operation of the cooling device 6 in the delay period, and in addition, controls the operation of the cooling device 6 so that the cooling air fed to the light source lamp 41 gradually increases. The projector according to the present embodiment and the projector 1 are different from each other in this point. It should be noted that in the explanation below, the part the same or substantially the same as the part having already been explained is denoted with the same reference symbol, and the explanation therefor will be omitted.

Figure 8:
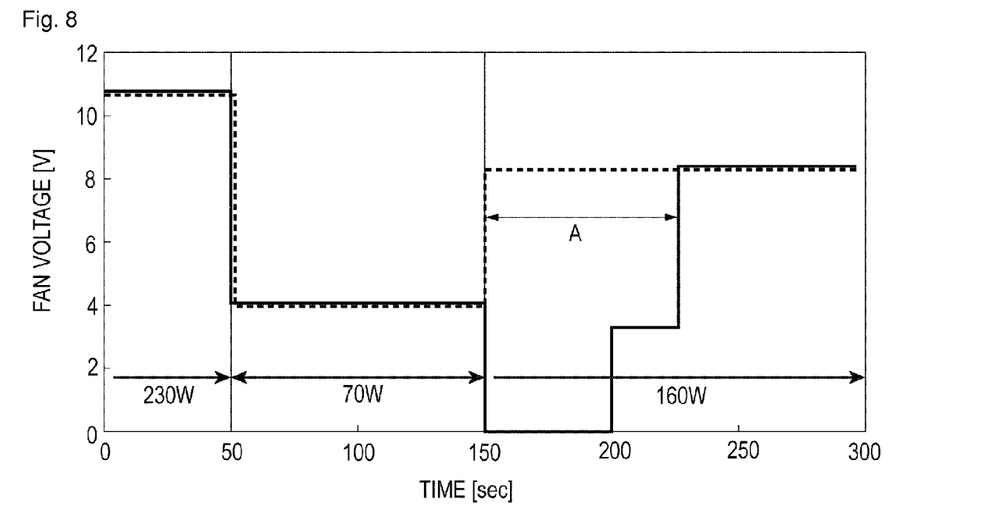
FIG. 8 is a diagram showing variations in the lamp electric power value and the fan voltage value in a projector according to a second embodiment of the invention.

FIG. 8 is a diagram showing a variation in the fan voltage value output by the cooling control section 76 of the projector according to the present embodiment.

The projector according to the present embodiment has substantially the same configuration as that of the projector 1, but is different from the projector 1 in some of the operation of the cooling control section 76 constituting the control device 7.

In other words, as shown in FIG. 8, in the projector according to the present embodiment, the drive control section 768 halts the operation of the cooling device 6 for a predetermined time period in the delay period after the lamp electric power is switched to the target power value higher than the previous power value. The predetermined time period corresponds to the halt period described above.

Further, the drive control section 768 controls the operation of the cooling device 6 so that the flow rate of the cooling air fed therefrom increases in a stepwise manner within a range not reaching the set flow rate corresponding to the target power value after the halt period has elapsed in the delay period. Specifically, the drive control section 768 controls the fan voltage so that the fan voltage applied to the fan 61 of the cooling device 6 increases in a stepwise manner, and the fan voltage indicated by the drive parameter corresponding to the target power value is applied to the fan 61 at the end of the delay period.

Meanwhile, since a period during which no cooling air is fed to the light source lamp 41 is provided by halting the cooling device 6 in the halt period, and in addition, the flow rate of the cooling air fed to the light source lamp 41 increases in a stepwise manner after the halt period has elapsed as described above, the period setting section 767 further reduces the delay period set in the manner described above to thereby newly set the delay period.

According to the projector related to the present embodiment explained hereinabove, in addition to the advantages substantially the same as those of the projector 1 described above, the following advantages can be obtained.

That is, the drive of the fan 61 of the cooling device 6 is halted in the transition from the low lamp electric power value to the high lamp electric power value. According to this operation, since it results that no cooling air is fed to the light source lamp 41, the rise in temperature in the discharge space of the light source lamp 41 can more promptly be performed, and thus the delay period set by the period setting section 767 can be reduced. Therefore, the blackening formed inside the discharge space can more promptly be eliminated, and thus the accumulation of the blackening can more efficiently be prevented. Further, since the drive of the fan 61 is halted, generation of the noise due to the drive of the fan 61 can be prevented.

Further, in the delay period, the drive control section 768 controls the cooling device 6 so that the flow rate of the cooling air fed to the light source lamp 41 increases in a stepwise manner after the halt period of the cooling device 6 has elapsed. In other words, the fan voltage supplied to the fan 61 is controlled to increase in a stepwise manner after the halt period has elapsed. Then, the drive control section 768 controls the cooling device 6 (the fan 61) based on the drive parameter corresponding to the target power value so that the cooling air at the set flow rate corresponding to the target power value is fed to the light source lamp 41 after the delay period elapses.

According to this operation, since it results that the rotational speed (the number of revolutions per unit time) of the fan 61 increases in a stepwise manner, the noise generated due to the drive of the fan 61 can be reduced compared to the case in which the rotational speed increases rapidly. Therefore, the noise during the operation of the projector can be reduced.

Modifications of Embodiments

The invention is not limited to the embodiments described above, but includes modifications and improvements in a range where the advantages of the invention can be achieved.

Although in each of the embodiments it is assumed that the period setting section 767 sets the delay period based on the difference between the target power value and the previous power value, the duration time of the previous power value, the voltage level of the lamp electric power of the target power value, and the drive parameter corresponding to the set flow rate of the cooling fluid fed from the cooling device 6 when the lamp electric power of the target power value is supplied, the invention is not limited thereto. That is, it is sufficient to set the delay period based on either one of these items, or it is possible to set the delay period and the fan voltage further taking any of other parameters (e.g., environmental temperature) into consideration.

Although in each of the embodiments it is assumed that the cooling device 6 has the fan 61 for feeding the cooling air for cooling the light source lamp 41, and the cooling control section 76 makes the power supply device 3 apply the fan voltage for driving the fan 61, the invention is not limited thereto. It is also possible to adopt the configuration in which, for example, the cooling device is provided with a control member, such as a louver, for controlling the flow rate of the cooling air fed to the light source lamp 41, and the cooling control section controls the operation of the control member. On this occasion, the drive of the fan can be performed at a constant fan voltage, or performed in conjunction with the drive control of the fan described above. In this case, further detailed control of the feeding flow rate to the light source lamp 41 can be performed.

Although in each of the embodiments the cooling device 6 feeds the cooling air as a cooling fluid, the invention is not limited thereto. For example, if the insulation of the light source lamp 41 is appropriately performed, it is also possible to cool the light source lamp 41 using a cooling medium such as ethylene glycol as the cooling fluid.

Although in each of the embodiments one target power value is set, and the delay period is set based on the target power value and so on, the invention is not limited thereto. It is also possible to adopt the configuration of, for example, setting a plurality of target power values, and increasing the electric power value of the lamp electric power in a stepwise manner. In this case, it is also possible to adopt the configuration of setting the delay period based on the final target power value and so on.

Although in the second embodiment it is arranged that the operation of the cooling device 6 is temporarily halted to thereby prevent the cooling air from being fed to the light source lamp 41 during the delay period, the invention is not limited thereto. That is, it is also possible to arrange that the operation of the cooling device 6 is stopped during the delay period providing the delay period can be set to an appropriate time period.

Although in the second embodiment it is arranged that the fan voltage applied to the fan 61 is increased in a stepwise manner so that the flow rate of the cooling air fed to the light source lamp 41 increases in a stepwise manner after the halt period elapses in the delay period, the invention is not limited thereto. That is, it is also possible to drive the fan so that the fan voltage gradually increases from the fan voltage based on the drive parameter corresponding to the previous power value without providing the halt period in the delay period. Further, it is also possible to drive the fan while increasing the fan voltage linearly or in a curved manner as the time elapses based on a predetermined function so that the flow rate of the cooling air increases gradually.

Further, although in each of the embodiments it is arranged that the drive of the fan 61 is controlled using the applied voltage level, it is also possible to arrange that the fan 61 is controlled using PWM as described above.

INDUSTRIAL APPLICABILITY

The invention can preferably be applied to a projector equipped with a light source lamp.

The entire disclosure of Japanese Patent Application No. 2011-003362, filed Jan. 11, 2011 is expressly incorporated by reference herein.

REFERENCE SIGNS LIST

1 Projector
6 Cooling device
41 Light source lamp
42 Light modulation device
43 Projection optical device
61 Fan
74 Lighting control section
76 Cooling control section
767 Period setting section

The invention claimed is:

1. A projector comprising: a light source lamp adapted to emit light in accordance with a lamp electric power supplied to the light source lamp; a light modulation device adapted to modulate the light emitted from the light source lamp; a projection optical device adapted to project the light modulated; a cooling device adapted to feed a cooling fluid to the light source lamp to thereby cool the light source lamp; a lighting control section adapted to supply the light source lamp with the lamp electric power having either one of a first electric power value and a second electric power value higher than the first electric power value to thereby light the light source lamp; and a cooling control section that controls the cooling device to feed the cooling fluid to the light source lamp at a lower flow rate lower than a set flow rate set in accordance with the second electric power value during a predetermined period after the lamp electric power supplied to the light source lamp is switched from the first electric power value to the second electric power value, and controls the cooling device to feed the cooling fluid to the light source lamp at the set flow rate after the predetermined period elapses.

2. The projector according to claim 1, wherein the cooling control section includes a period setting section adapted to set the predetermined period based on the set flow rate.

3. The projector according to claim 1, wherein the cooling control section includes a period setting section adapted to set the predetermined period based on a difference between the first electric power value and the second electric power value.

4. The projector according to claim 1, wherein the cooling control section includes a period setting section adapted to set the predetermined period based on a time period during which the lamp electric power of the first electric power value is supplied.

5. The projector according to claim 1, wherein the cooling control section includes a period setting section adapted to set the predetermined period based on a voltage level of the lamp electric power of the second electric power value.

6. The projector according to claim 1, wherein the cooling control section sets a period during which the cooling device is halted in the predetermined period.

7. The projector according to claim 1, wherein the cooling device includes a fan adapted to feed the cooling fluid, and the cooling control section controls the fan to gradually increase the flow rate of the cooling fluid fed to the light source lamp within a range failing to reach the set flow rate during the predetermined period.

8. The projector according to claim 1, wherein the lower flow rate is set in accordance with the first electric power value.

* * * * *